United States Patent
Chateau-Artaud et al.

(10) Patent No.: US 9,256,902 B2
(45) Date of Patent: Feb. 9, 2016

(54) NON-TRANSITORY COMPUTER-READABLE MEDIA FOR PRESENTING PRODUCT RECOMMENDATIONS

(75) Inventors: Vanina Delobelle Chateau-Artaud, St. Charles, IL (US); Jude Reter, Chicago, IL (US); Brian P. Hopkins, Arlington Heights, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 796 days.

(21) Appl. No.: 13/442,501

(22) Filed: Apr. 9, 2012

(65) Prior Publication Data

US 2013/0268392 A1 Oct. 10, 2013

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0641* (2013.01); *G06Q 30/0601* (2013.01); *G06Q 30/0631* (2013.01); *G06Q 30/02* (2013.01); *G06Q 30/0282* (2013.01)

(58) Field of Classification Search
CPC .................................. G06Q 30/0601–30/0645
USPC ............................................. 705/26.1–27.2
See application file for complete search history.

(56) References Cited

U.S. PATENT DOCUMENTS

| | | |
|---|---|---|
| 2004/0254950 A1 | 12/2004 | Musgrove et al. |
| 2007/0011146 A1 | 1/2007 | Holbrook |
| 2008/0242279 A1 | 10/2008 | Ramer |
| 2010/0007601 A1 | 1/2010 | Lashina et al. |
| 2010/0076960 A1* | 3/2010 | Sarkissian et al. ............ 707/722 |
| 2010/0293034 A1* | 11/2010 | Olejniczak et al. ............. 705/10 |
| 2012/0036037 A1 | 2/2012 | Xiao et al. |
| 2012/0054874 A1* | 3/2012 | Chaudhri ........................ 726/26 |

FOREIGN PATENT DOCUMENTS

WO WO2011/160018 A1 12/2011

OTHER PUBLICATIONS

Duval, B. K. (1998). The RDS business reference suite. Library Software Review, 17(4), 277-286.*
Int'l Search Report and Written Opinion for PCT/US2013/035591 dated Jul. 11, 2013.
PTO, Notification Concerning the Transmittal of International Preliminary Report on Patentability, in Application PCT/US2013/035591, mailed Oct. 23, 2014 (9 pages).
Euoprean Patent Office, Communication with extended European search report in application No. 13776283.7, dated Oct. 10, 2015 (7 pages).

* cited by examiner

*Primary Examiner* — Resha Desai
(74) *Attorney, Agent, or Firm* — McAndrews, Held & Malloy, Ltd.

(57) ABSTRACT

Product recommendations are presented to a consumer by presenting to the consumer a plurality of thumbnail images that correspond to a plurality of products. The plurality of thumbnail images are presented to the consumer in a plurality of tier groupings and each of the plurality of tier groupings is indicative of a relative ranking of products within a trend that is being tracked. In response to a user interacting with a one or more of the plurality of presented thumbnail images, the consumer is further presented with at least one of a zoomed-in version of the one or more of the plurality of presented thumbnail images interacted with by the consumer and a product detail page for a product corresponding to the one or more of the plurality of presented thumbnail images interacted with by the consumer.

18 Claims, 5 Drawing Sheets

NON-TRANSITORY COMPUTER-READABLE MEDIA FOR PRESENTING PRODUCT RECOMMENDATIONS

BACKGROUND

The subject disclosure generally relates to retail services and, more particularly, to a system and method for presenting product recommendations.

Systems and methods for analyzing product trends, e.g., purchasing trends, rating trends, viewing trends, etc., and for presenting to a consumer information related to such product trends, e.g., product recommendations, are known in the art. For example, prior art FIG. 1 illustrates a Web page which allows a consumer to view "best selling" products, "top rated" products, and "most wished for" products as determined by the operator of the corresponding Web site system. Because the Web page of FIG. 1 only functions to present to the consumer a small sampling of the products that are included within a product trend of interest, e.g., the top three "most wished for" products, the Web page of FIG. 1 additionally includes a link, e.g., the "See Top 100" link, by which the consumer can instruct the Web site system to present a further Web page on which will be included a more complete listing of the products that are within the product trend of interest. As additionally illustrated in FIG. 1, the product trends can be filtered to present to the consumer only those products that are trending within a specified product category, e.g., women's clothing, handbags, etc.

By way of further example, U.S. Published Application No. 2005/0154629 discloses a system for analyzing trends of products while U.S. Pat. No. 7,590,616 discloses a method an apparatus for recommending products based upon explicit and implicit ratings of products made by consumers. These publications are incorporated herein by reference in their entirety.

SUMMARY

Described hereinafter is an improved system and method for presenting to a user product recommendations, particularly for presenting as recommendations products that are most liked, most wanted, most owned, most purchased, most viewed, and/or most popular within some other system tracked category. More particularly, product recommendations are presented to a consumer by presenting to the consumer a plurality of thumbnail images that correspond to a plurality of products. The plurality of thumbnail images are presented to the consumer in a plurality of tier groupings and each of the plurality of tier groupings is indicative of a relative ranking of products within a trend that is being tracked. In response to a user interacting with a one or more of the plurality of presented thumbnail images, the consumer is further presented with at least one of a zoomed-in version of the one or more of the plurality of presented thumbnail images interacted with by the consumer and a product detail page for a product corresponding to the one or more of the plurality of presented thumbnail images interacted with by the consumer.

A better understanding of the objects, advantages, features, properties and relationships of the system and method will be obtained from the following detailed description and accompanying drawing which sets forth illustrative embodiments which are indicative of the various ways in which the principles of the system and method may be employed.

BRIEF DESCRIPTION OF THE DRAWINGS

For a better understanding of the systems and methods described hereinafter reference may be had the following drawings in which:

Figure 1:
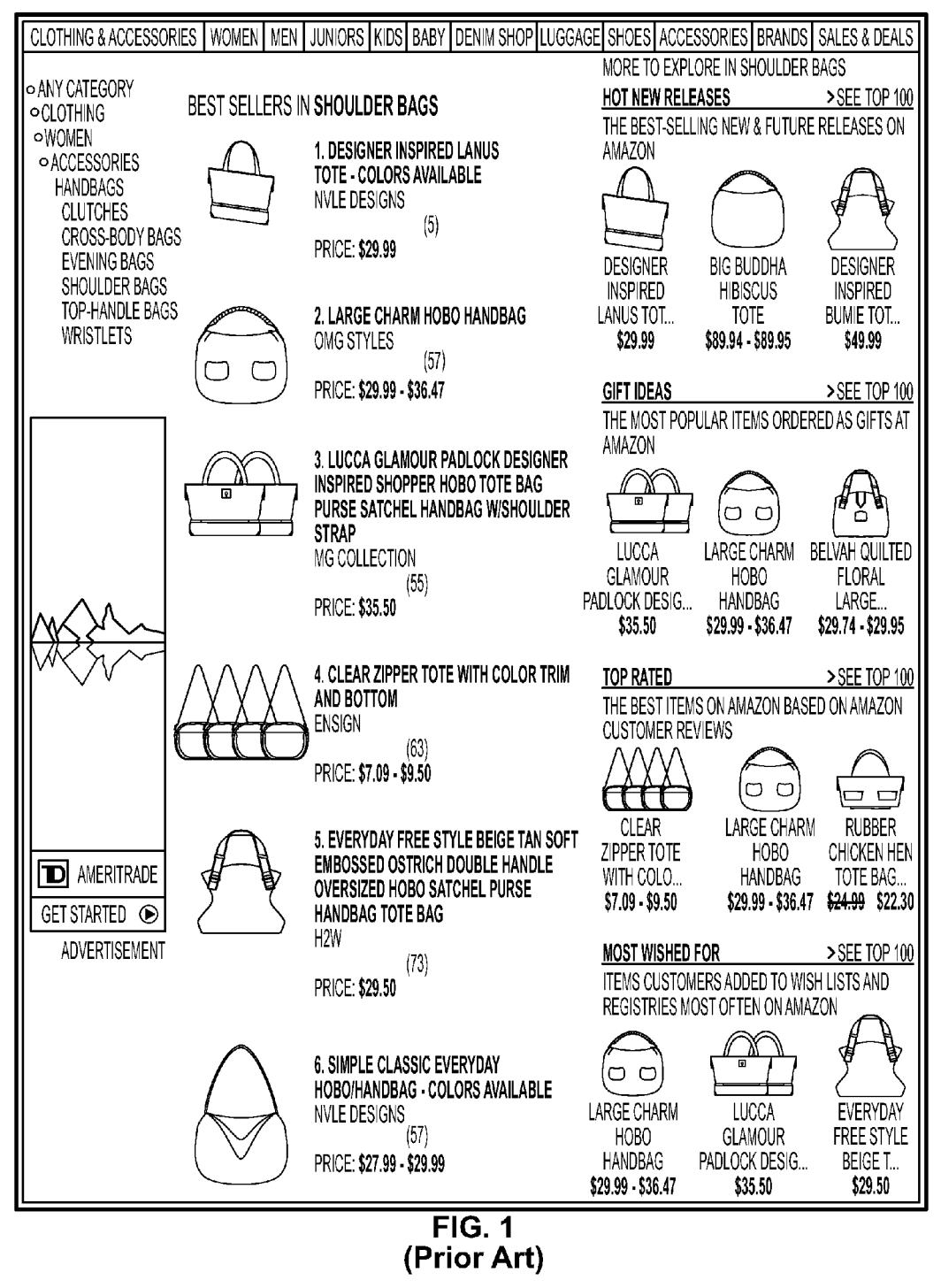

FIG. 1 illustrates a prior art Web page which functions to present to a consumer a small sampling of trending products as product recommendations;

FIG. 5 illustrates an exemplary presentation of a product detail page.

DETAILED DESCRIPTION

Referring now to the Figures, an improved system and method for presenting product recommendations to a consumer is hereinafter described. More particularly, the system and method provides an intuitive graphical user interface by which a user may view product recommendations wherein product recommendations are presented to the consumer through the use of tiers and wherein the tiers correspond to rankings of products within one or more product trends. While the system and method is described in the context of a consumer interacting with the graphical user interface as presented on a smart phone or tablet computer having a touch screen, it is to be understood that the methods described hereinafter are not intended to be so limited. Rather, those of ordinary skill in the art will recognize that one or more of the method steps described hereinafter may be practiced using any type of device or devices having touch sensing capabilities, motion sensing capabilities, and/or the like type of capabilities.

Figure 2:
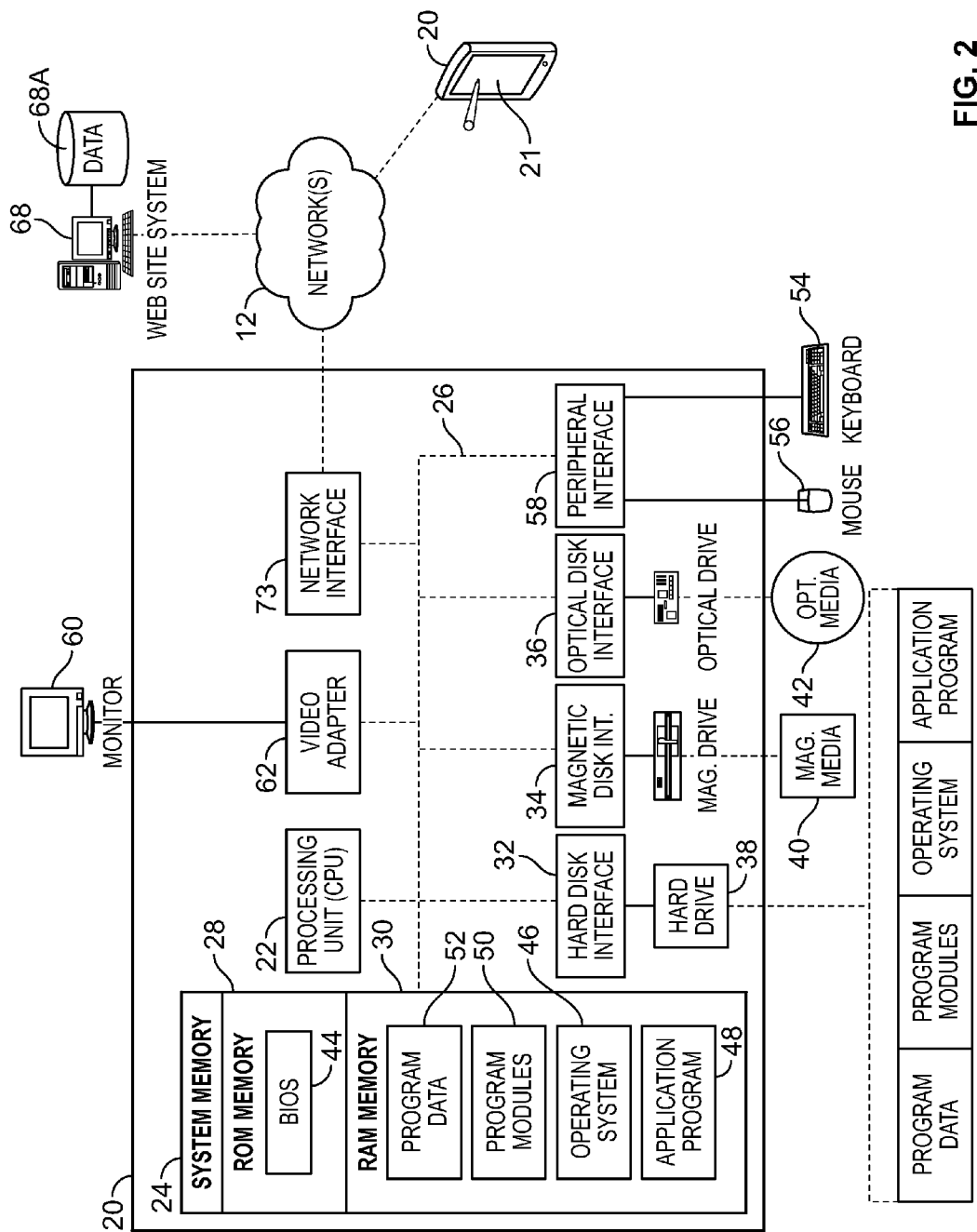
FIG. 2 illustrates an exemplary system in which the principles of the subject invention may be employed.

Turning now to FIG. 2, an exemplary computer network for presenting product recommendations to a consumer is illustrated. In this illustrated example, a processing device 20, such as a smart phone, table computer, or the like, is provided with executable instructions to, for example, provide a means for the consumer to access a Web site system server 68 and thereby browse products, order products, schedule and/or manage delivery of ordered products, schedule and/or manage pick-up of ordered products, request that ordered products be placed on hold at a retail establishment, and the like. Generally, the computer executable instructions would reside in program modules which may include routines, programs, objects, components, data structures, etc. that perform particular tasks or implement particular abstract data types. It will be appreciated that the executable instructions could reside in whole or in part of the processing device 20 and/or may be distributed throughout the computer network whereby the various tasks described hereinafter may be performed by various devices in the computer network or otherwise within a cloud computing environment. Furthermore, it will be appreciated that, in such a distributed system, the various devices may be linked via a local and/or wide-area network as necessary.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30, i.e., non-transitory computer readable media. Additional, similar memory devices may also be made accessible to the processing device 20 by means of, for example, a hard disk drive interface 32, a magnetic disk drive interface 34, flash-drive interface, USB interface, and/or an optical disk drive interface 36. As will be understood, these devices, which would be linked to the system bus 26, respectively allow for reading from and writing to a hard disk 38, reading from or writing to a removable magnetic disk 40 or other removable storage media, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser or mobile App), other program modules 50 (such as a touch screen driver), and/or program data 52. Still further, computer-executable instructions may be downloaded to one or more of the computing devices as needed, for example via a network connection.

To allow a user to enter commands and information into the processing device 20, input devices such as a touch screen 21, keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device (e.g., touch screen 21) may also be connected to the bus 26 via an interface, such as a video adapter 62. In addition to the monitor 60, the processing device 20 may also include other peripheral output devices, not shown, such as speakers and printers.

As noted, the processing device 20 may also utilize logical connections to one or more remote processing devices, such as the Web site system server 68 having associated data repository 68A. In this regard, while the Web site system server 68 has been illustrated in the exemplary form of a computer, it will be appreciated that the Web site system server 68 may, like processing device 20, be any type of device having processing capabilities. Again, it will be appreciated that the Web site system server 68 need not be implemented as a single device but may be implemented in a manner such that the tasks performed by the Web site system server 68 are distributed amongst a plurality of processing devices/databases located at different geographical locations and linked through a communication network. Additionally, the Web site system server 68 may have logical connections to other third party systems via the network 12 and, via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the Web site system server 68 may include many or all of the elements described above relative to the processing device 20. In addition, the Web site system server 68 would generally include executable instructions for, among other things, presenting product recommendations, making items available for purchase, handling search requests, providing search results, accessing pricing information related to items, accessing inventory and item availability data, providing a means for the consumer to schedule and/or manage orders for delivery and facilitating any such delivery of ordered items, providing a means for a consumer to schedule and/or manage orders for pickup and facilitating any such pickup of ordered product, and/or providing a means for a consumer to request that ordered product be placed on hold at a retail establishment and facilitating any such hold request. Communications between the processing device 20 and the Web site system server 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the Web site system server 68.

For presenting product recommendations to a consumer, the data repository 68A stores information concerning the ranking of a product within a particular product trend category, e.g., most liked, most wanted, most owned, most purchased, most viewed, and/or most popular within some other system tracked category. As methods for tracking and analyzing product trends are known in the art, they will not be described herein for the sake or brevity. While not required, the data repository 68A may also store information concerning product relationship rankings which product relationship rankings may also and/or alternatively be considered when providing product recommendations to a consumer. Without limitation, such product relationship rankings might track how products rank as being purchased together, viewed together, owned together, liked together, wanted together, or the like, e.g., rankings indicative of the products most often purchased with product A, viewed with product A, owned with product A, or the like.

Figure 3:
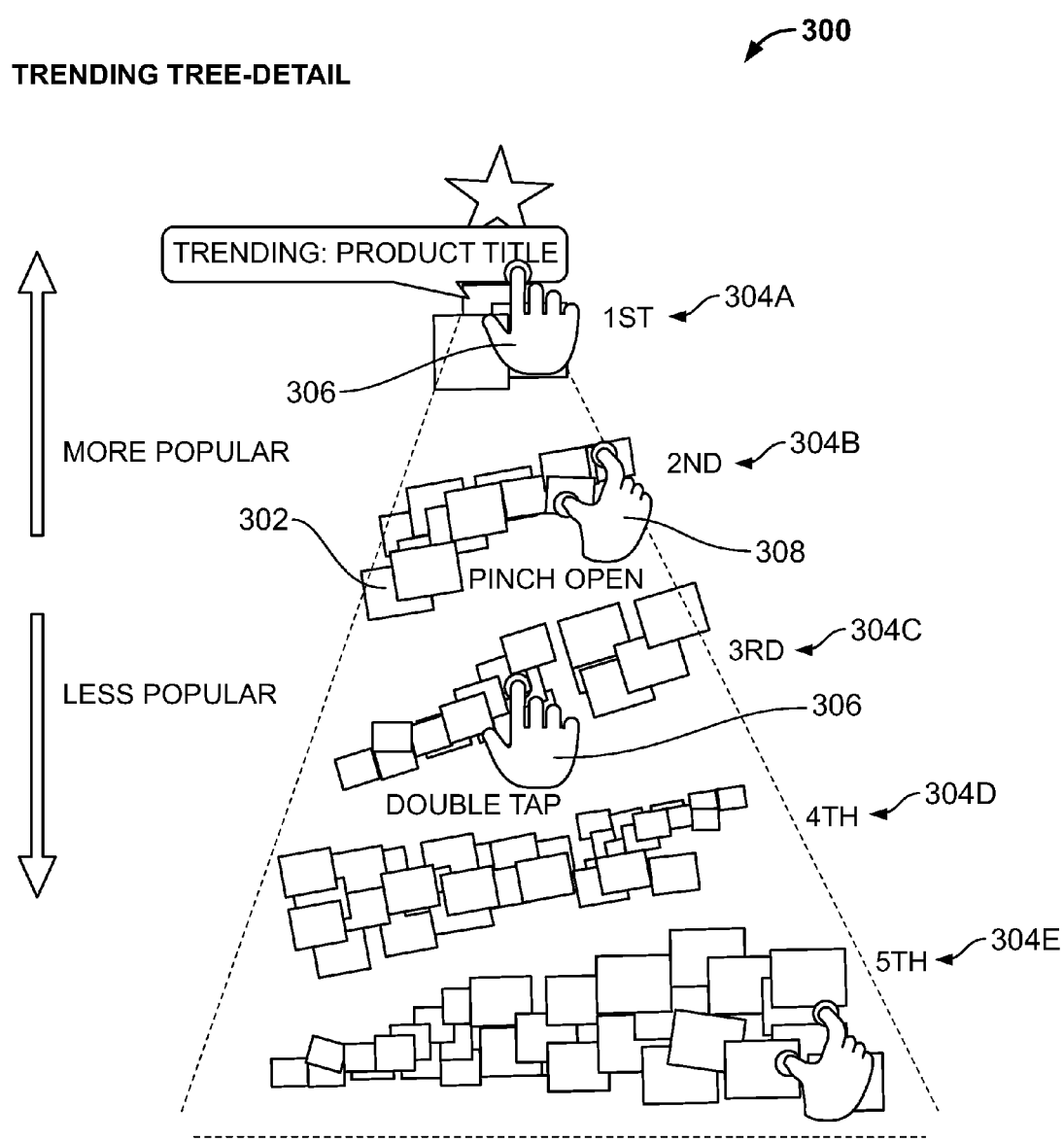
FIG. 3 illustrates an exemplary presentation of a product recommendations in the form of a product trending tree.

Turning now to FIG. 3, for presenting product recommendations to a consumer, the Web site system server 68 provides to the processing device 20 data and/or instructions as needed for use in presenting a product trending tree 300. The product trending tree 300 may be caused to be presented as a result of the consumer invoking an app on the processing device 20, by retrieving a Web page from the Web site system server 68, or the like. As shown in FIG. 3, the product trending tree 300 generally comprises thumbnail images 302 of products which are grouped into tiers 304A-304E. The tiers 304A-304E include a predetermined number of thumbnail images 302 such that the number of thumbnail images in the first tier 304A is less than the number of thumbnail images 302 in the second tier 304B which is less the number of thumbnail images 302 in the third tier 304C, etc. as clearly shown in FIG. 3. The system selects which thumbnail image 302 to include in each tier based upon how the corresponding product is trending in any given trend of interest, e.g., how often the product is being purchased, viewed, etc. relative to other products considering a given period of time which information would be contained within the data repository 68A. In this manner, the products that are trending higher will have their corresponding thumbnail image 302 placed into a lower numerical level of the plural tiers 304. Thus, by way of non-limiting example with reference to FIG. 3 considering a "purchasing" trend, the thumbnail images 302 corresponding to the top three most often purchased products over a given period of time will be shown in the tier 1 grouping, the thumbnail images 302 corresponding to the next thirteen most often purchased products over the given period of time will be shown in the tier 2 grouping, the thumbnail images 302 for the next X most often purchased products over the given period of time will be shown in the tier 3 grouping, the thumbnail images 302 for the next Y (where Y>X) most often purchased products over the given period of time will be shown in the tier 4 grouping, etc. Products within a presented tier grouping can also be positioned within the each individual tier grouping considering the relative trend ranking of the products within that individual tier grouping, e.g., the thumbnail images 302 of products can be presented from right to left, top to bottom, etc. within a tier grouping as a function of the relative ranking of each product within that trend tier grouping. In keeping with the above example, in such a case the thumbnail image 302 for the fourth most purchased item, which would be included in the tier 2 grouping, could be positioned to the right most and/or highest most position within the tier 2 grouping relative to the remaining thumbnail images 302 within the tier 2 grouping, etc. As will be understood, this method for presenting trending products can be utilized to reflect how a product is trending in any given measurable category. Furthermore, it will be understood that the illustrated spacing between the thumbnail images 302 in the various tier groupings need not be exactly duplicated. Rather, any form of illustrating some delineation between the various tiers can be utilized. Similarly, the number of tiers provided as well as the number of products to increasingly include in each "less popular" tier grouping can be selected as a matter of design choice. Still further, the tiers need not be arranged vertically as illustrated but could be arranged in other orientations and/or patterns as desired to indicate products and their relative individual and/or group ranking position within a trend of interest.

In some instances, the thumbnail images 302 of products within a tier grouping 304 can be clustered, i.e., positioned in the vicinity of one another within a single tier grouping or across tier groupings, as a function of one or more characteristics of the products. Such characteristics might include a product type, product category, product brand, product color, product use, product size, etc. and/or may be a characteristic that indicates that products are often purchased, viewed, owned together, etc. In this manner, when presenting a trending tree 300 associated with a trend in women's apparel for example, the system may cause the thumbnail images 302 of women's shoes to be clustered, the thumbnail images 302 of women's handbags to be clustered, etc. Similarly, when presenting a trending tree 300 associated with a trend in women's shoes, the system may cause the thumbnail images 302 of blue shoes (or pumps) to be clustered, the thumbnail images of red shoes (or flats) to be clustered, etc. It will also be appreciated that sub-clustering of the thumbnail images 302 could also be utilized, e.g., within a women's shoe cluster of the trending tree 300 associated with a trend in women's apparel, the system may cause the thumbnail images 302 of blue shoes (or pumps) to be sub-clustered, the thumbnail images of red shoes (or flats) to be sub-clustered, etc.

In still further instances, the system may feed data to the device 20 so as to cause a presented trending tree 300 to be updated while it is being viewed by the consumer, i.e., the trending tree 300 can be animated. For example, as the relative rankings of products with a given trend change, the system may cause the thumbnail images 302 of products to be moved between tier groupings as appropriate. If the system is robust enough to capture and analyze product trending information in near real-time, such product moving animation can likewise be performed in near real-time. In other instances, such thumbnail image 302 animation can be "faked" to cause products to be moved for, among other purposes, drawing the attention to a user of one or more products that a vendor would particularly like the consumer to consider for purchase.

Figure 4B:
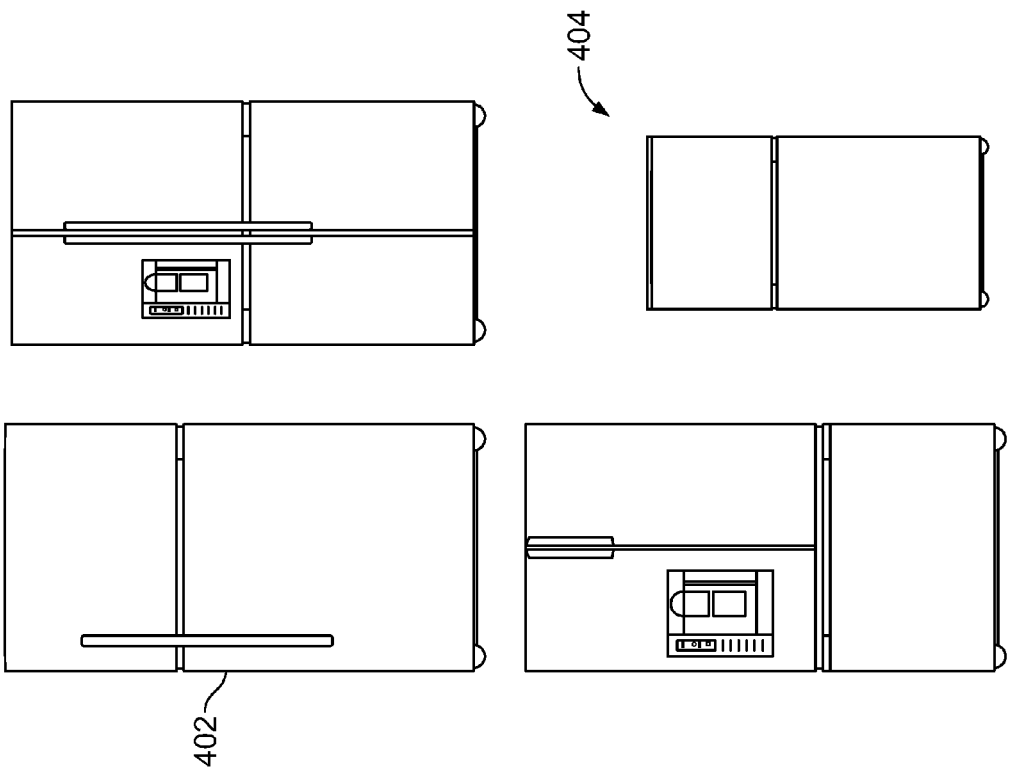
FIGS. 4A and 4B illustrate exemplary presentations of zoomed-in thumbnail images.
Figure 4A:
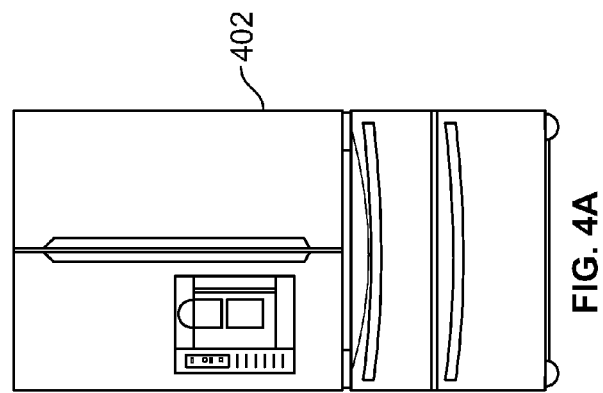
Figure 5:
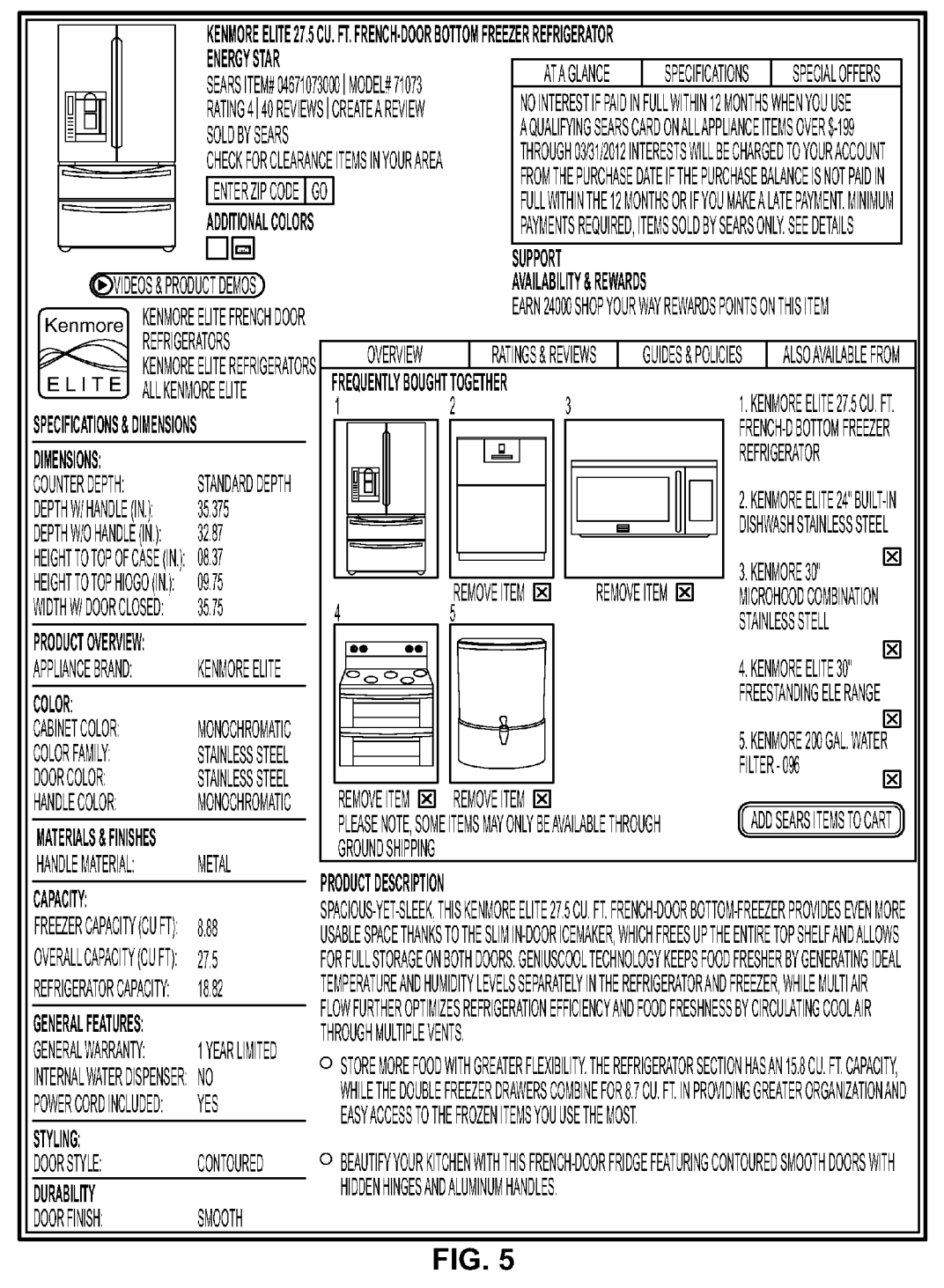

To gain additional information with respect to one or more products that might be of interest to the consumer, the consumer may directly interact with the presented product trending tree 302. For example, by means of a gesture based input provided to the touch screen 21 of the processing device 20, the consumer can select a location within the presented product trending tree 302 to cause the system to present one or more "zoomed-in," i.e., larger, thumbnail images 402 as shown in FIGS. 4A and 4B. More particularly and by way of further example, a user tapping 306 on a thumbnail image 302 in the tier 1 grouping can instruct the system to present a single "zoomed-in" thumbnail image 402 corresponding to the interacted with, i.e., tapped upon, thumbnail image 302. The "zoomed-in" thumbnail image 402 can be presented to the consumer in a pop-up window overlaying the presented product trending tree 302, can be presented to the consumer in place of the presented product trending tree 302, can be presented to the consumer along side the product trending tree 302, or the like within limitation. The system may further function to respond to a user interaction with the "zoomed-in" thumbnail image 402 to cause the presentation of a product detail page for the product corresponding to the "zoomed-in" thumbnail image 402 as illustrated in FIG. 5. By the product detail page, the consumer can see details for the product corresponding to the "zoomed-in" thumbnail image 402, can be presented with additional product purchasing opportunities ,e.g., product "frequently purchased" with the product corresponding to the "zoomed-in" thumbnail image 402, and/or initiate a purchase of the product corresponding to the "zoomed-in" thumbnail image 402 (or even another products navigated to from the product detail page)—i.e., a successful recommendation result from the point-of-view of the vendor. To exit the presentation of the "zoomed-in" thumbnail image 402, e.g., to return to the presentation of the product trending tree 300, the user can activate a "return" button or key of the processing device 20, can tap on the touch screen 21 on the processing device 20 in an area outside of the "zoomed-in" thumbnail image 402, or the like without limitation. In some instances, a user interacting with a title presented with the trending tree 300 may cause the system to present the "zoomed-in" thumbnail image 402 of the overall highest trending product. In further instances, a user interacting with the "zoomed-in" thumbnail image 402 (in a manner different than an interaction which would invoke the product details page) can cause the system to present plural "zoomed-in" thumbnail images 402 as shown in FIG. 4B, e.g., for products similarly trending, products that are alternatives to the product corresponding to the "zoomed-in" thumbnail images 402, for products often purchased with the product corresponding to the "zoomed-in" thumbnail images 402, and the like. These further presented "zoomed-in" thumbnail images 402 can also be interacted with by the user to cause similar results, e.g., to cause the presentation of a product detail page, to cause the display of a further or different plurality of "zoomed-in" thumbnail images 402, etc.

Yet further, the system could respond to a consumer making a swiping gesture or opening gesture 308 by causing the direct presentation of the plurality of "zoomed-in" thumbnail images 402 as illustrated in FIG. 4B. In this case, the plural "zoomed-in" thumbnail images 402 can be those that correspond to all or a select sub-set of (e.g., the higher ranking with the trend tier) the thumbnail images 302 in the area underlying or in the vicinity of the gesture 308. As before, the consumer can interact with the "zoomed-in" thumbnail images 402 to cause the presentation of a product detail page, to cause the display of a further or different plurality of "zoomed-in" thumbnail images 402, and the like. Similarly, the consumer can interact with the processing device 20 to cause the presentation of the plural "zoomed-in" thumbnail images 402 to be removed from the touch screen display 21 in favor of the trending tree 300. It will be appreciated that the number of "zoomed-in" thumbnail images to present to the user in this manner can be selected as needed, particularly considering the screen size of the processing device 20.

While various concepts have been described in detail, it will be appreciated by those skilled in the art that various modifications and alternatives to those concepts could be developed in light of the overall teachings of the disclosure. Further, while various aspects of the invention have been described in the context of functional modules, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transitory, computer-readable media having instructions stored thereon which instructions, when executed by a processing device, perform steps comprising:

presenting, on a web page, a plurality of thumbnail images corresponding to a plurality of products, wherein the plurality of thumbnail images are presented in a plurality of tier groupings, each of the plurality of tier groupings being indicative of a relative ranking of products within a trend that is being tracked, wherein each of the plurality of tier groupings includes therein a differing number of the plurality of thumbnail images, wherein one of the plurality of tier groupings indicative of a highest relative ranking of products within the trend that is being tracked includes the fewest number of the plurality of thumbnail images, and wherein one of the plurality of tier groupings indicative of a lowest relative ranking of products within the trend that is being tracked includes the largest number of the plurality of thumbnail images; and responding to a user interaction with one or more of the plurality of presented thumbnail images to cause, on the web page, a presentation of one or more of a zoomed-in version of the one or more of the plurality of presented thumbnail images interacted with and a product detail page for a product corresponding to the one or more of the plurality of presented thumbnail images interacted with, wherein the user interaction comprises a selection of one of the plurality of thumbnail images made via a tapping gesture upon a touch screen display, wherein the instructions cause a presentation of a zoomed-in version of the one of the plurality of thumbnail images selected via the tapping gesture.

2. The computer-readable media as recited in claim 1, wherein the web page is displayed on a mobile phone that is operatively coupled to a web server.

3. The computer-readable media as recited in claim 1, wherein the plurality of tier groupings are arranged vertically with the one of the plurality of tier groupings indicative of the highest relative ranking of products within the trend that is being tracked being positioned higher in the presentation relative to the one of the plurality of tier grouping indicative of the lowest relative ranking of products with the trend that is being tracked to thereby present the plurality of thumbnail images in a tree-like formation.

4. The computer-readable media as recited in claim 1, wherein thumbnail images within one or more of the plurality of tier groups are clustered as a function of one or more product characteristics.

5. The computer-readable media as recited in claim 4, wherein thumbnail images within a cluster are sub-clustered as a function of one or more further product characteristics.

6. The computer-readable media as recited in claim 1, wherein the instructions function to cause thumbnail images to be moved between the plurality of tier grouping concurrent with a tracking of the trend.

7. The computer-readable media as recited in claim 1, wherein the zoomed-in version of the one of the plurality of thumbnail images is presented in the touch screen display in lieu of the plurality of thumbnail images.

8. The computer-readable media as recited in claim 1, wherein the instructions present the product detail page in response to the user interaction with the zoomed-in version of the one of the plurality of thumbnail images.

9. The computer-readable media as recited in claim 1, wherein the user interaction comprises a selection of a subset of the plurality of thumbnail images made via a moving gesture upon a touch screen display.

10. The computer-readable media as recited in claim 9, wherein the instructions cause a presentation of zoomed-in versions of at least the subset of the plurality of thumbnail images selected via the moving gesture.

11. The computer-readable media as recited in claim 10, wherein the zoomed-in versions of at least the subset of the plurality of thumbnail images is presented in the touch screen display in lieu of the plurality of thumbnail images.

12. The computer-readable media as recited in claim 10, wherein the instructions present a product detail page in response to a user interaction with one of the zoomed-in versions of at least the subset of the plurality of thumbnail images.

13. The computer-readable media as recited in claim 1, wherein the trend being tracked comprises a trend indicative of one or more of the products being most liked, most wanted, most owned, most purchased, or most viewed.

14. A non-transitory, computer-readable media having instructions stored thereon which instructions, when executed by a processing device, perform steps comprising:
  presenting, on a web page, a plurality of thumbnail images corresponding to a plurality of products, wherein the plurality of thumbnail images are presented in a plurality of tier groupings, each of the plurality of tier groupings being indicative of a relative ranking of products within a trend that is being tracked; and
  responding to a user interaction with one or more of the plurality of presented thumbnail images to cause, on the web page, a presentation of one or more of a zoomed-in version of the one or more of the plurality of presented thumbnail images interacted with and a product detail page for a product corresponding to the one or more of the plurality of presented thumbnail images interacted with, wherein the user interaction comprises a selection of one of the plurality of thumbnail images made via a tapping gesture upon a touch screen display, wherein the instructions cause a presentation of a zoomed-in version of the one of the plurality of thumbnail images selected via the tapping gesture, and wherein the instructions present a plurality of zoomed-in versions of select ones of the plurality of thumbnail images in response to a user interaction with the zoomed-in version of the one of the plurality of thumbnail images.

15. The computer-readable media as recited in claim 14, wherein thumbnail images within one or more of the plurality of tier groups are clustered as a function of one or more product characteristics.

16. The computer-readable media as recited in claim 15, wherein thumbnail images within a cluster are sub-clustered as a function of one or more further product characteristics.

17. The computer-readable media as recited in claim 14, wherein the instructions function to cause thumbnail images to be moved between the plurality of tier grouping concurrent with a tracking of the trend.

18. The computer-readable media as recited in claim 14, wherein the instructions present a product detail page in response to a user interaction with the zoomed-in version of the one of the plurality of thumbnail images.

* * * * *